US005908592A

United States Patent [19]

Kimura et al.

[11] Patent Number: 5,908,592

[45] Date of Patent: Jun. 1, 1999

[54] PREPARATION OF HIGH FATIGUE ENDURANCE LIQUID SILICONE RUBBER COMPOSITION

[75] Inventors: Kenichi Kimura, Annaka; Takeo Yoshida, Usui-gun; Manabu Narumi, Chiyoda-ku; Masaya Arakawa, Annaka, all of Japan

[73] Assignee: Shin-Etsu Chemical Co., Ltd., Japan

[21] Appl. No.: 08/965,488

[22] Filed: Nov. 6, 1997

[30] Foreign Application Priority Data

Nov. 7, 1996 [JP] Japan .................................... 8-311429

[51] Int. Cl.[6] ........................... B29C 47/40; B29C 47/76; C08K 5/24

[52] U.S. Cl. ..................... 264/102; 264/211; 264/211.21; 264/211.23; 264/349; 366/75; 366/76.1; 366/83; 366/91; 524/730; 524/789; 524/847; 528/15; 528/18; 528/21; 528/23

[58] Field of Search .................................... 264/102, 211, 264/211.21, 211.23, 349; 366/75, 76.1, 83, 91; 524/730, 789, 847; 528/15, 18, 21, 23

[56] References Cited

U.S. PATENT DOCUMENTS

| | | | |
|---|---|---|---|
| 5,118,754 | 6/1992 | Miyakoshi et al. | 524/730 X |
| 5,198,171 | 3/1993 | Kasahara et al. | 264/211.23 |
| 5,610,230 | 3/1997 | Yoshida et al. | 524/730 |

FOREIGN PATENT DOCUMENTS

| | | |
|---|---|---|
| 568891 | 11/1993 | European Pat. Off. . |
| 61-130344 | 6/1986 | Japan . |
| 3-47664 | 7/1991 | Japan . |
| 8-208994 | 8/1996 | Japan . |

OTHER PUBLICATIONS

Patent Abstracts of Japan, vol. 095, No. 011, Dec. 26, 1995.
Abstract of Japan 61–130,344 (Published Jun. 18, 1986).
Abstract of Japan 3–47,664 (Published Jul. 22, 1991).

*Primary Examiner*—Leo B. Tentoni
*Attorney, Agent, or Firm*—Miller, White, Zelano, & Branigan, P.C.

[57] ABSTRACT

A liquid silicone rubber base including (A) an alkenyl-containing organopolysiloxane, (B) a reinforcing silica filler, (C) a mixing assistant in the form of a silanol-containing compound, (E) an organohydrogen polysiloxane, (f) a platinum catalyst and optionally, (D) a wetting auxiliary catalyst is prepared by previously mixing 10–120 parts of component (A) with 1–35 parts of component (C) and 0–35 parts of component (D) to form a premix liquid, mixing the premix liquid with 100 parts of component (B) to form a premix power, and kneading the premix powder with the remainder of component (A). By adding a curing agent of organohydrogenpolysiloxane/platinum catalyst to the liquid silicone rubber base, there is obtained a liquid silicone rubber composition having improved fatigue endurance.

5 Claims, 2 Drawing Sheets

PREPARATION OF HIGH FATIGUE ENDURANCE LIQUID SILICONE RUBBER COMPOSITION

BACKGROUND OF THE INVENTION

1. Field of the Invention

This invention relates to a method for preparing a silicone rubber base useful as a source of silicone rubber for use in electric, automotive and business machine applications and a silicone rubber composition comprising the silicone rubber base. More particularly, it relates to a method for preparing a high fatigue endurance liquid silicone rubber composition within a relatively short time which maintains a stable viscosity during storage and cures into an elastomeric product having improved fatigue endurance.

2. Prior Art

In the current silicone rubber market, attention is paid to liquid silicone rubber compositions which are smoothly flowing, readily applicable through injection molding machines and automatically processable. Among others, many methods have been developed for the preparation of addition curing type liquid silicone rubber compositions of the versatile product formulation based on alkenyl group-containing organopolysiloxane. These methods are designed to comply with a line for the manufacture of various types of products. A liquid silicone rubber base is utilized as a common intermediate, and a particular silicone rubber composition is prepared by blending the base with appropriate curing agents and other ingredients.

The silicone rubber base is prepared by various methods which are either batchwise or continuous although the continuous methods suffer from more problems. For example, JP-B 47664/1991 and JP-A 130344/1986 propose to mix predetermined amounts of an alkenyl group-containing organopolysiloxane as a base component and a powdery silica filler. These methods take a long time for the manufacture of a desired composition because an initial mixing time of more than 1 hour and a heat treating time of 1 to 30 hours above 140° C. are generally required for a batchwise formulation. For the manufacture of silicone rubber base using a large scale manufacturing installation, about 30 hours is sometimes necessary when both the treatment times are combined. On the other hand, the continuous methods do not insure a sufficient treatment time because the residence time within the kneader is very short. Then the liquid silicone rubber base thickens and loses shelf stability. For the cured product (silicone rubber) obtained from such a liquid silicone rubber base, there also occur losses of basic rubbery properties such as elongation and tensile strength and a loss of fatigue endurance due to insufficient dispersion of the filler.

Solutions to this problem have been proposed. JP-A 32909/1994 corresponding to EP 568891 A discloses a method for continuously preparing a liquid silicone rubber while providing an average residence time of more than 15 minutes. JP-A 102007/1990 corresponding to U.S. Pat. No. 5,198,171 discloses a method for continuously preparing a base compound comprising a polyorganosiloxane having a higher viscosity (raw rubber) as a main component in admixture with a reinforcing silica filler and various mixing assistants (i.e., so-called "wetter" or "wetting agent" which can improve affinity or wettability and dispersibility between an organopolysiloxane and silica fillers). Since simply mixing the components in a continuous kneader takes a long time until a uniform mix is obtained, this method involves previously uniformly dispersing the polyorganosiloxane and the silica filler in a high speed mechanical shearing mixer to form a free flowing powder and continuously feeding the powder into a twin screw extruder, thereby preparing a silicone compound within a short time.

The above method uses organosilanes (e.g., diphenylsilane diol, dimethylsilane diol, dihydroxypolydimethylsiloxane and dimethoxypolydimethylsiloxane) or low viscosity polysiloxanes as the mixing assistant. With only these mixing assistants used, it was difficult to impart satisfactory flow and good shelf stability to the liquid silicone rubber base.

When hexamethyldisilazane is used instead of the silicone oil, the resulting composition is improved in flow, but becomes deteriorated in cured properties, loses viscosity stability during storage, and fails to provide fatigue endurance.

SUMMARY OF THE INVENTION

Therefore, an object of the present invention is to provide a method for continuously preparing a liquid silicone rubber composition which method enables the preparation of a liquid silicone rubber base within a significantly reduced residence time for kneading and the preparation of a liquid silicone rubber composition from the base which is capable of minimizing a viscosity increase during storage (that is, having improved storage stability) and curing into a product having improved fatigue endurance.

The invention pertains to a method for preparing a liquid silicone rubber base by continuously mixing (A) an alkenyl group-containing organopolysiloxane, (B) a reinforcing silica filler, (C) a mixing assistant (i.e., wetting agent), and optionally (D) an auxiliary catalyst capable of promoting a wetting effect. We have found that the liquid silicone rubber base can be continuously prepared within a significantly reduced residence time by previously mixing a part of the alkenyl group-containing organopolysiloxane with the mixing assistant and optionally, the auxiliary catalyst in a specific proportion to form a premix liquid, mixing the premix liquid with the powdery silica filler to form a premix powder, and uniformly mixing the premix powder with the remainder of the alkenyl group-containing organopolysiloxane in a specific proportion in a continuous kneader. Silicone rubber obtained from the base has improved physical properties. A liquid silicone rubber composition obtained using the base experiences a minimized viscosity increase during shelf storage, that is, has improved storage stability and cures into a product having improved fatigue endurance.

In connection with the continuous preparation of a liquid silicone rubber base by mixing (A) an organopolysiloxane having at least two alkenyl groups each attached to a silicon atom in a molecule and having a viscosity of 100 to 300,000 centistokes at 25° C., (B) a reinforcing silica filler having a specific surface area of at least 50 $m^2/g$ as measured by the BET method, (C) a mixing assistant of the following general formula (1) or (2):

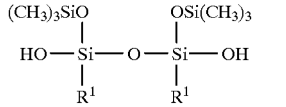

(1)

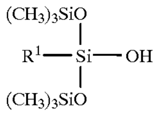

(2)

wherein $R^1$ is a methyl, trimethylsiloxy, vinyl or trifluoropropyl group, and optionally, (D) an auxiliary catalyst capable of promoting a wetting effect, the present invention provides a method for preparing a high fatigue endurance liquid silicone rubber composition comprising the steps of previously mixing 10 to 120 parts by weight of component (A) with 1 to 35 parts by weight of component (C) and 0 to 35 parts by weight of component (D) per 100 parts by weight of component (B) to form a premix liquid; mixing the premix liquid with 100 parts by weight of component (B) to form a premix powder; kneading 100 parts by weight of the premix powder with at least 20 parts by weight of component (A) to form a liquid silicone rubber base; and thereafter, adding a curing agent to the liquid silicone rubber base. The curing agent consists of (E) an organohydrogenpolysiloxane having at least two hydrogen atoms each attached to a silicon atom in a molecule and (F) a platinum catalyst.

In one preferred embodiment, the step of kneading the premix powder with component (A) is carried out by means of a first single, twin or multiple screw continuous kneader having an entire length between an inlet and an outlet. An aft region of the kneader extending from the outlet to a position of 10 to 80% of the entire length toward the inlet is maintained at a temperature of 200 to 350° C. A forward region of the kneader extending from the inlet to a position of less than 50% of the entire length toward the outlet and not overlapping the aft region is maintained at a temperature of not higher than 60° C. Preferably, the premix powder and a part of the component (A) to be kneaded therewith are fed into the forward region of the kneader, and the remainder of the component (A) is fed into the aft region. A vacuum deaerator is preferably disposed near the outlet of the kneader for removing low molecular weight materials and unreacted materials from the liquid silicone rubber base. More preferably, the first kneader at the outlet is connected to a second single, twin or multiple screw continuous kneader which is maintained at a temperature of 150 to 300° C. for further kneading the silicone rubber base.

DETAILED DESCRIPTION OF THE INVENTION

Figure 1:
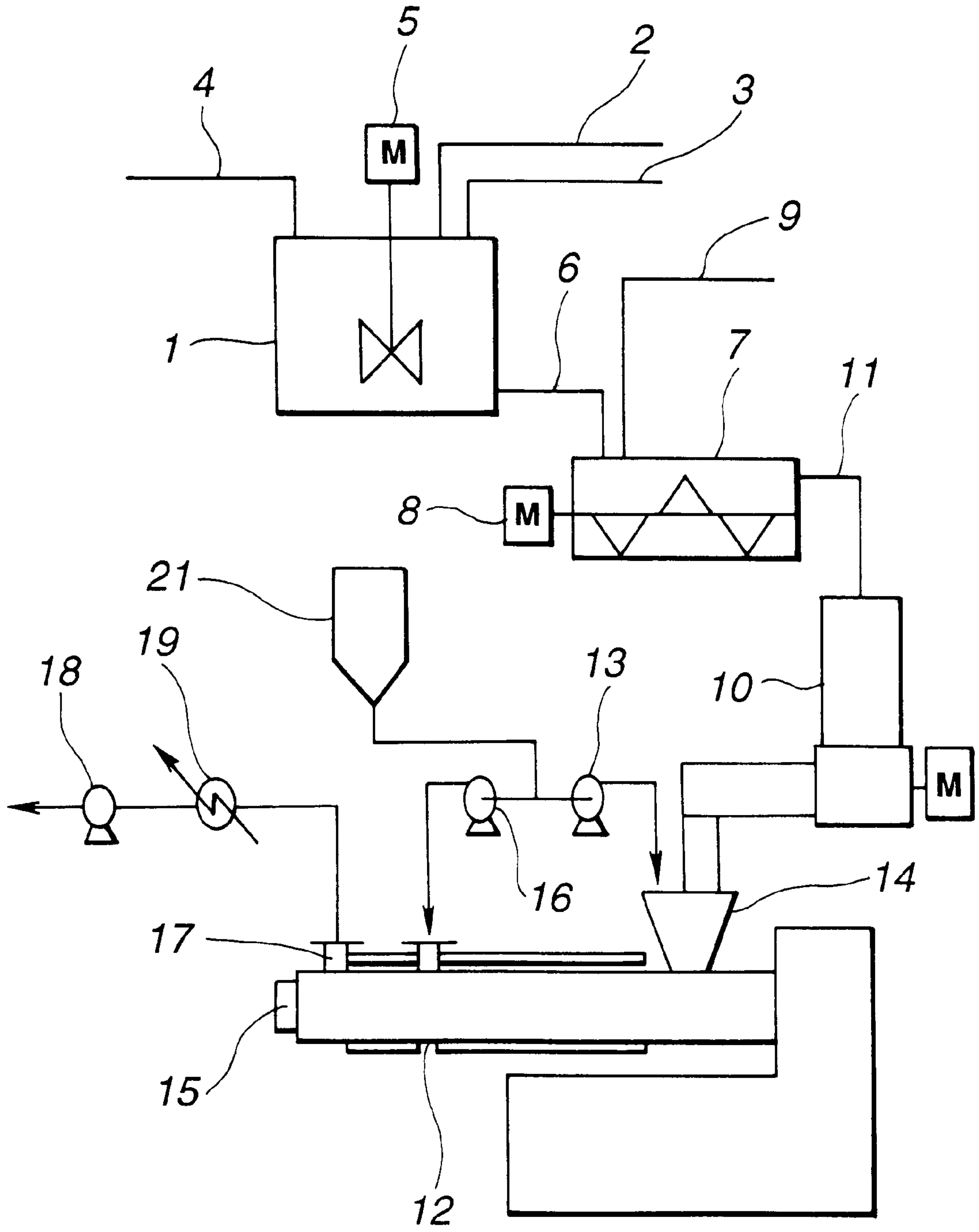
FIG. 1 is a schematic view of one exemplary system for use in the practice of the invention.

Component (A), organopolysiloxane is a main component of the liquid silicone rubber composition of the invention. The organopolysiloxane should have at least two alkenyl groups each attached to a silicon atom in a molecule.

The preferred organopolysiloxane is represented by the following average compositional formula (3):

$$R_aSiO_{(4-a)/2} \quad (3)$$

wherein R is a substituted or unsubstituted monovalent hydrocarbon group attached to a silicon atom, preferably having 1 to 12 carbon atoms, more preferably 1 to 8 carbon atoms. Examples include alkyl groups such as methyl, ethyl, propyl, isopropyl, butyl, pentyl, neopentyl, hexyl, heptyl, octyl, nonyl, decyl and dodecyl; cycloalkyl groups such as cyclopentyl, cyclohexyl, and cycloheptyl; alkenyl groups such as vinyl, allyl, propenyl, isopropenyl, butenyl, isobutenyl, hexenyl, and cyclohexenyl; aryl groups such as phenyl, tolyl, xylyl, naphthyl, and biphenyl; aralkyl groups such as benzyl, phenylethyl, phenylpropyl, and methylbenzyl; and substituted ones of these groups wherein some or all of the hydrogen atoms are replaced by halogen atoms such as fluorine, chlorine and bromine or cyano groups, for example, chloromethyl, 2-bromoethyl, 3,3,3-trifluoropropyl, 3-chloropropyl, and cyanoethyl.

In the organopolysiloxane of formula (3), at least two of the organic groups represented by R are alkenyl groups. Preferably, the alkenyl group accounts for 0.001 to 20 mol %, especially 0.01 to 10 mol % of the entire R groups. Outside the range, a smaller proportion of the alkenyl group would result in a composition which becomes less curable whereas a larger proportion of the alkenyl group would result in a cured product which becomes low in physical properties including tensile strength, tear strength, elongation, and fatigue endurance. It is noted that the alkenyl group may be attached to either a silicon atom at the end of a molecular chain or a silicon atom intermediate of a molecular chain or both.

In formula (3), letter a is a positive number of 1.65 to 2.35, preferably 1.8 to 2.2, more preferably 1.95 to 2.05. The structure of the organopolysiloxane is often preferred to be linear and have an alkenyl group at the end of a molecular chain although a branched structure may be partially contained. More preferably, the organopolysiloxane is blocked at the end of its molecular chain with a triorganosilyl group such as trivinylsilyl, methyldivinylsilyl, dimethylvinylsilyl, and trimethylsilyl.

An appropriate molecular weight may be selected for the organopolysiloxane. In most cases, the organopolysiloxane should have a viscosity of 100 to 300,000 centistokes at 25° C., preferably 1,000 to 100,000 centistokes at 25° C. because it must cure into a rubbery elastomer and form a liquid silicone rubber composition.

Component (B) is a reinforcing silica filler having a specific surface area of at least 50 $m^2/g$ as measured by the BET method. Useful silica fillers include fumed silica, fired silica, and precipitated silica alone or in admixture of two or more. The silica filler may also be surface treated with suitable agents such as linear organopolysiloxanes and hexamethyldisilazane.

The silica filler (B) should have a specific surface area of at least 50 $m^2/g$ as measured by the BET method. Particularly for providing transparency and reinforcement to the silicone rubber composition, fumed silica having a specific surface area of 50 to 600 $m^2/g$, especially 100 to 400 $m^2/g$ is desirable. Also, in view of the cost and physical properties such as elasticity of the silicone rubber composition, reinforcing precipitated silica having a specific surface area of 50 to 600 $m^2/g$, especially 100 to 400 $m^2/g$ is desirable.

In preparing a premix powder to be described later (in the second step), component (A) is preferably blended in an amount of 10 to 120 parts, more preferably 40 to 80 parts by weight of the organopolysiloxane (A) per 100 parts by weight of the silica filler (B). If the amount of component (A) is more or less than this range, the resulting silicone rubber composition becomes difficult to mold and cures into a product having rather poor mechanical strength such as tensile strength and tear strength.

Component (C) as a mixing assistant (i.e., a wetting agent for components (A) and (B)) is a silanol group-containing compound of the following general formula (1) or (2). In the manufacture of a premix liquid which is carried out prior to the manufacture of a premix powder, component (C) is blended with component (A) and optional component (D) when they are previously mixed to form a premix liquid (i.e., before component (A) is mixed with component (B)). Component (C) blended at this stage is effective for improving the fatigue endurance, flow and viscosity stability during storage of the silicone rubber composition.

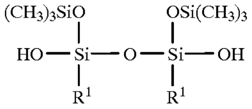

(1)

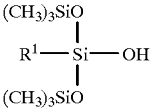

(2)

$R^1$ is methyl, trimethylsiloxy, vinyl or trifluoropropyl.

As described in JP-A 228782/1995 corresponding to U.S. Pat. No. 5,597,853, the compound of formula (1) can be prepared by well-known methods, for example, by hydrolyzing 1,1,1,3,5,7,7,7-octamethyltetrasiloxane or 3,5-bis (trimethylsiloxy)-1,1,1,7,7,7-hexamethyltetrasiloxane in the presence of a Pd/C catalyst.

Also, the compound of formula (2) can be prepared by well-known methods, for example, by hydrolyzing 1,1,1,3, 5,5,5-heptamethyltrisiloxane or 3-(trimethylsiloxy)-1,1,1,5, 5,5-hexamethyltrisiloxane in the presence of a Pd/C catalyst.

The compounds of formulae (1) and (2) may be used alone or in admixture of two or more. The amount of the compound (C) blended is 1 to 35 parts, preferably 1 to 20 parts, more preferably 2 to 10 parts by weight per 100 parts by weight of the silica filler (B). With less than 1 part of the mixing assistant (C), the uniformity of the premix powder and the compatibility between the organopolysiloxane and the powder silica filler become insufficient, and the composition finally obtained is not improved in fatigue endurance and viscosity stability during storage because the high activity of silica is not suppressed. With more than 35 parts of the mixing assistant (C), no further improvement by the mixing assistant is expected and the step of positively removing an excess of the mixing assistant becomes necessary, which increases the cost and time of the manufacturing process, resulting in an economical disadvantage. Additionally, the mechanical properties of a cured product are adversely affected and its fatigue endurance is reduced.

Component (D), which is optional, is an auxiliary catalyst. The auxiliary catalyst is effective not only for facilitating the feed to a continuous kneader of a premix powder or intermediate obtained by mixing components (A), (B), and (C), but also for promoting reaction of silanol groups on the silica filler surface of component (B) and silanol groups of component (C). Examples of the auxiliary catalyst include ammonia, aqueous ammonia, ammonium salts such as tetrabutylammonium hydroxide, phosphorus-siliconate salts as shown below, potassium-siliconate salts as shown below, tin compounds such as tin octylate and dibutyltin dilaurate, titanium compound such as tetrabutyl titanate, and zinc compounds such as zinc octylate and zinc naphthylate. Ammonia and aqueous ammonia are preferred among others.

Phosphorus-siliconate salts

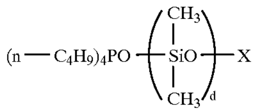

d: an integer of 3 to 100

X: H or $(C_4H_9)_4P$—

Potassium-siliconate salts

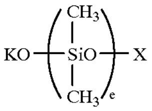

e: an integer of 3 to 100

Y: K or H

The amount of component (D) blended is 0 to 35 parts, preferably 1 to 10 parts by weight per 100 parts by weight of component (B) and 0 to 1.0 part, preferably 0.1 to 0.8 parts by weight per part by weight of component (C). More than 1.0 part of component (D) per part by weight of component (C) would adversely affect curing and mechanical properties.

The mixing assistant (i.e., wetting agent) as component (C) and optional auxiliary catalyst as component (D) are added not only for making the organopolysiloxane (A) and the powdery silica filler (B) miscible to facilitate the formation of a premix powder, but also for facilitating the subsequent step of kneading the premix powder with the organopolysiloxane. They react with silanol groups on the surface of the powdery silica filler (B) to promote the dispersion of the silica filler, thereby achieving a silicone rubber composition having improved fatigue endurance, a minimized viscosity increase during storage, enough storage stability, and good flow.

Next, the method for preparing a liquid silicone rubber composition is described.

First, a liquid silicone rubber base is prepared by continuously mixing (A) an alkenyl group-containing organopolysiloxane having a viscosity of 100 to 300,000 centistokes at 25° C., (B) a powdery silica filler, (C) a mixing assistant, and optionally, (D) an auxiliary catalyst. According to the invention, the liquid silicone rubber base is prepared by the first step of previously mixing 10 to 120 parts, preferably 40 to 80 parts by weight of alkenyl group-containing organopolysiloxane (A) with 1 to 35 parts, preferably 2 to 20 parts by weight of mixing assistant (C) and 0 to 35 parts, preferably 1 to 10 parts by weight of auxiliary catalyst (D) per 100 parts by weight of powdery silica filler (B) to form a premix liquid, the second step of mixing the premix liquid (i.e., the mixture of components (A), (C) and optionally (D) described in the first step) with 100 parts by weight of powdery silica filler (B) to form a premix powder, and the third step of kneading 100 parts by weight of the premix powder described in the second step with at least 20 parts by weight of alkenyl group-containing organopolysiloxane (A).

The mixing assistant (C) is not directly mixed with the powdery silica filler (B), but previously mixed in the first step with a part of the alkenyl group-containing organopolysiloxane (A) and optionally, the auxiliary catalyst (D) to form a uniform premix liquid before the premix liquid is added to the powdery silica filler (B) to form a premix powder in the second step. The first step of forming the premix liquid does not require a complex operation since both component (A) and component (C) are liquid. The components can be mixed into a fully uniform premix by simple mixing techniques using a simple stirring rod or hand drill in a mixing tank. When continuous mixing is desired, a suitable mixer, for example, a static mixer may be incorporated in piping.

In the second step of forming the premix powder, 100 parts by weight of powdery silica filler (B) is mixed with the premix liquid, preferably 11 to 140 parts, especially 40 to 100 parts by weight of the premix liquid consisting of the organopolysiloxane (A), mixing assistant (C) and optionally, auxiliary catalyst (D). If the amount of the premix liquid exceeds 140 parts, the mixture resulting from the mixing of the premix liquid and the powdery silica filler would become liquid or bulk rather than powder. Less than 11 parts of the premix liquid would be too small to achieve effective kneading of the mixture with the remainder of the alkenyl group-containing organopolysiloxane (A) in the third step. A continuous mixer is suitable for forming the premix powder. Such a continuous mixer may be selected from vertical and horizontal, high speed (≧1,000 rpm), medium speed, and low speed (50 to 100 rpm) rotating mixers. As long as the selection of the components and the amounts thereof is appropriate as mentioned above, the premix powder can be readily obtained. The residence time during mixing is usually 10 seconds to 5 minutes. It is possible that the second step be directly followed by the third step.

The third step is to knead 100 parts by weight of the premix powder with at least 20 parts, preferably 30 to 200 parts, more preferably 40 to 150 parts by weight of the alkenyl group-containing organopolysiloxane (A) in a continuous kneader until uniform, thereby forming the liquid silicone rubber base. The amount of the alkenyl group-containing organopolysiloxane (A) added in the third step varies depending on the desired viscosity of the liquid silicone rubber base, the desired rubber strength of a final product, etc. The alkenyl group-containing organopolysiloxane (A) which is the main component may be fed to the continuous kneader in various ways, for example, by adding the entirety or by adding divided portions at forward and aft stages. The addition of divided portions is preferred for increasing the rubber strength of a final product. It is more preferred to add a less amount at the forward stage.

The continuous kneader may be a single, twin or multiple screw continuous kneader which can be heated, with the twin screw continuous kneader being especially preferred. Ceramic stone mills and disc type shearing mixers having stones mills axially mounted in multiple stages (e.g., KCK continuous kneader by KCK K.K.) are also useful as the continuous kneader.

The preferred continuous kneader is of the following construction. The continuous kneader defines an interior having an entire length between an inlet and an outlet. An aft region of the kneader interior that extends from the outlet (i.e., the position of 0%) to a position of 10 to 80%, more preferably 50 to 80% of the entire length toward the inlet is maintained at a relatively high temperature of 200 to 350° C., more preferably 250 to 300° C. In this sense, the aft region may also be referred to as a heated region. With temperatures below 200° C., the liquid silicone rubber base would experience a viscosity rise during shelf storage, that is, lose storage stability. With temperatures above 350° C., the main chain of the alkenyl group-containing organopolysiloxane would be scissored so that a final product based on the liquid silicone rubber base might lose rubbery physical properties.

Removal means, for example, a vacuum deaerator may be disposed near the outlet of the kneader for removing unreacted low molecular weight materials contained in the alkenyl group-containing organopolysiloxane and/or oligomeric low molecular weight materials, unreacted mixing assistant, and auxiliary catalyst from the liquid silicone rubber base.

Furthermore, a forward region of the kneader interior that extends from the inlet (i.e., the position of 0%) to a position of less than 50% of the entire length toward the outlet and not overlapping the aft region is maintained at a temperature of not higher than 60° C. If the continuous kneader is entirely heated above 60° C., the premix powder upon entry into the kneader would not be smoothly taken into the kneader inlet, but kept away therefrom, resulting in the liquid silicone rubber base having a non-uniform composition. In the initial stage of kneading where the premix powder and the alkenyl group-containing organopolysiloxane are contacted, intermixed and merged with each other, the temperature is preferably set below 60° C., preferably 5 to 60° C., most often near room temperature (e.g., 10 to 35° C).

In the kneader whose temperature is set to the abovementioned distribution, the premix powder is fed and the alkenyl group-containing organopolysiloxane is added and kneaded therewith. In one way, the entire amount of the alkenyl group-containing organopolysiloxane to be added may be introduced into the forward region of the kneader which is maintained below 60° C., preferably near room temperature. In another way, which is preferred, the entire amount of the organopolysiloxane to be added is divided into two portions which are added at the forward and aft stages. A first portion corresponding to ¼ to ¾ of the entire amount of organopolysiloxane is introduced into the forward region of the kneader and the remainder is introduced into the heated region.

An appropriate kneading time is generally 30 seconds to 10 minutes, especially 1 to 5 minutes although the kneading time may be properly determined without undue experimentation.

In a further preferred embodiment, the kneader (designated first kneader) at the outlet is connected to a second single, twin or multiple screw continuous kneader for further kneading the silicone rubber base which has been kneaded in the first kneader. The second kneader is maintained at a temperature of 150 to 300° C. An appropriate kneading time in this stage is generally 3 to 30 minutes.

Figure 2:
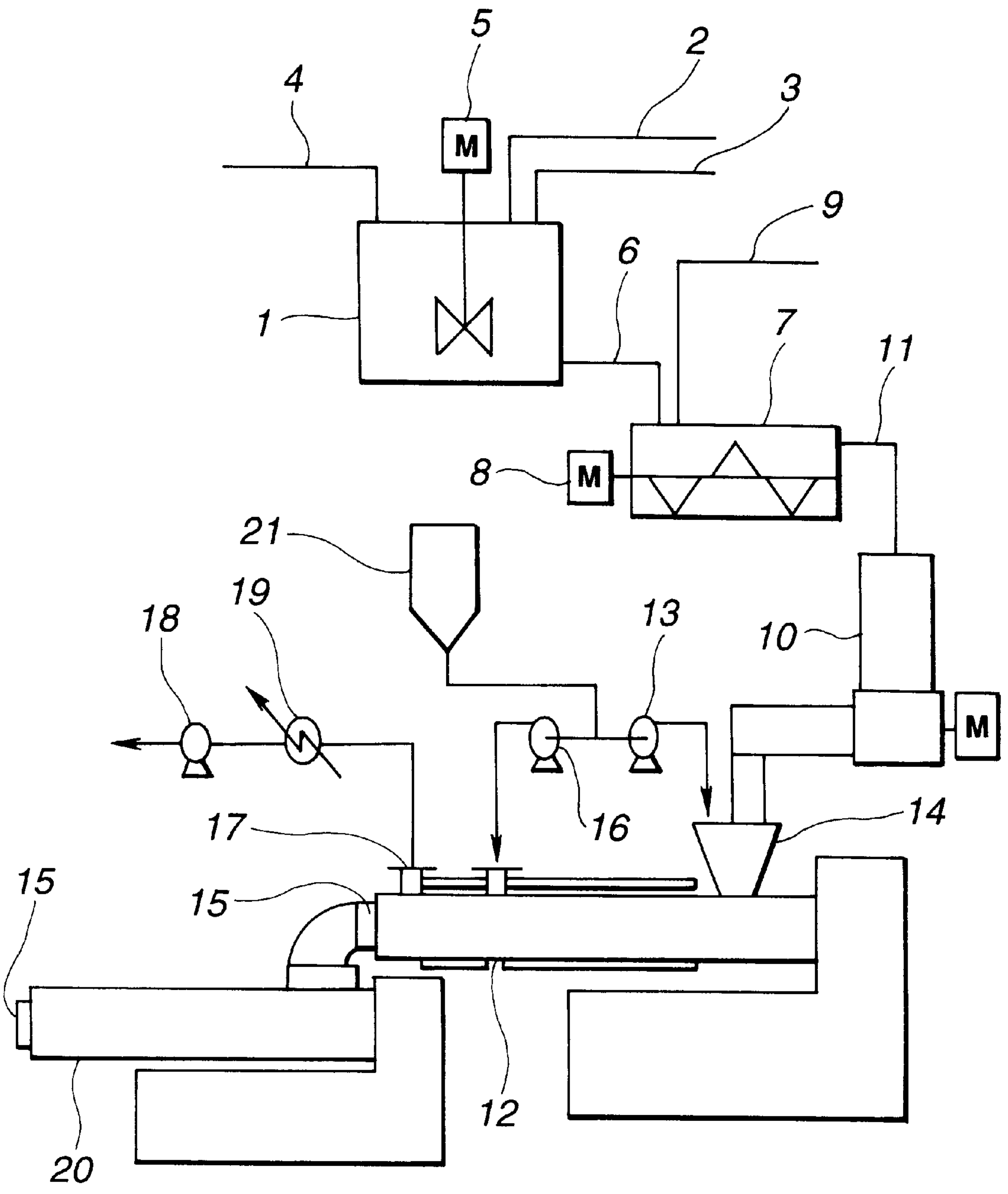
FIG. 2 is a schematic view of another exemplary system for use in the practice of the invention.

Referring to FIGS. 1 and 2, there are illustrated exemplary systems for preparing a silicone rubber base. The system includes a liquid mixing tank 1 for forming a premix liquid. To the mixing tank 1 are connected a line 2 for supplying the alkenyl group-containing organopolysiloxane as the main component, a line 3 for continuously supplying the mixing assistant, and a line 4 for supplying the auxiliary catalyst. A blade agitator 5 is disposed in the tank 1. A line 6 is connected between the mixing tank 1 and a horizontal mixer 7 for discharging the premix liquid from the tank 1 to the mixer 7. The horizontal mixer 7 is equipped with a blade agitator 8 like the liquid mixing tank 1. A line 9 is connected to the mixer 7 for supplying the powdery silica filler. In the mixer 7, the premix liquid is mixed with the powdery silica filler to form a premix powder. The mixer 7 is connected through a line 11 to a powder constant delivery meter 10 for metering the premix powder. The premix powder is metered and fed to a twin screw continuous kneader 12 through a hopper 14. Also connected to the hopper 14 is a line 13 for supplying the alkenyl group-containing organopolysiloxane from a main component tank 21. The kneader 12 also has an outlet 15 for delivering the liquid silicone rubber base kneaded therein. A line 16 for supplying the alkenyl group-containing organopolysiloxane from the main component tank 21 is connected to the kneader 12 near its outlet 15. A vent 17 for removing low molecular weight materials is disposed near the outlet 15 of the kneader 12 and connected to a vacuum pump 18 via a condenser 19 for effecting vacuum deaeration.

In the embodiment of FIG. 2, a second continuous kneader 20 is serially connected to the first continuous kneader 12.

According to the invention, a curing agent is added to the liquid silicone rubber base thus obtained, thereby forming a high fatigue endurance liquid silicone rubber composition.

The curing agent used herein consists of (E) an organohydrogenpolysiloxane having at least two hydrogen atoms each attached to a silicon atom in a molecule and (F) a platinum catalyst. The organohydrogenpolysiloxane (E) and the platinum catalyst (F) may be known ones commonly used in the preparation of conventional addition reaction curing type liquid silicone rubber compositions.

The organohydrogenpolysiloxane as component (E) serves as a crosslinking agent for the silicone rubber composition. More particularly, the hydrogen atom attached to a silicon atom in component (E) undergoes addition reaction to the alkenyl group attached to a silicon atom in component (A) in the presence of the platinum catalyst (F), to effect crosslinking, thereby curing the silicone rubber composition. The organohydrogenpolysiloxane (E) should have at least two hydrogen atoms each attached to a silicon atom (that is, SiH groups) in a molecule. Preferably the organohydrogenpolysiloxane has 2 to 200 SiH groups, especially 3 to 50 SiH groups.

The preferred organohydrogenpolysiloxane is represented by the following general compositional formula (4).

$$R'_bH_cSiO_{(4-b-c)/2} \quad (4)$$

Herein, R' is a substituted or unsubstituted monovalent hydrocarbon group having 1 to 12 carbon atoms, preferably 1 to 8 carbon atoms, for example, those groups exemplified for R, preferably such groups free of an aliphatic unsaturated bond. Especially preferred are alkyl, aryl, aralkyl and substituted alkyl groups. Letters b and c are positive numbers satisfying $0.8 \geqq b \geqq 2.2$, $0.002 \geqq c \geqq 1.0$, and $1.0 < b+c \geqq 3.0$. The molecular structure of the organohydrogenpolysiloxane (E) may be linear, cyclic, branched or network while the SiH group may be positioned at the end or intermediate the molecular chain. Although no particular limit is imposed on the molecular weight of component (E), it preferably has such a molecular weight as to give a viscosity in the range of 1 to 1,000 centipoise at 25° C., more preferably 3 to 500 centipoise at 25° C.

The organohydrogenpolysiloxane (E) is blended in such an amount that the ratio of the number of hydrogen atoms each attached to a silicon atom (that is, SiH groups) in component (E) to the number of alkenyl groups each attached to a silicon atom in component (A) may range from 0.5:1 to 20:1, especially from 1:1 to 3:1. If this ratio of SiH group to alkenyl group is too low, full curing is not always expectable. Too high a ratio has the risk of foaming.

The platinum group catalyst (F) is to catalyze the curing of the silicone rubber composition. Such platinum group catalysts include finely divided metallic platinum catalysts as disclosed in U.S. Pat. No. 2,970,150, chloroplatinic acid catalysts as disclosed in U.S. Pat. No. 2,823,218, platinum-hydrocarbon complexes as disclosed in U.S. Pat. Nos. 3,159,601 and 3,156,946, chloroplatinic acid-olefin compounds as disclosed in U.S. Pat. No. 3,516,946, and platinum-vinylsiloxane complexes as disclosed in U.S. Pat. Nos. 3,775,452 and 3,814,780. The catalyst (F) is preferably added in a sufficient amount to give 0.1 to 1,000 ppm, especially 1 to 100 ppm of metallic platinum based on the weight of components (A) and (E) combined. Less than 0.1 ppm of the catalyst would be ineffective for the composition to cure whereas more than 1,000 ppm of the catalyst would add to the cost.

The silicone rubber composition of the invention is a liquid composition having fluidity. Although no particular limit is imposed on the viscosity of the composition, an appropriate viscosity is 50 to 50,000 poise at 25° C., especially 200 to 20,000 poise at 25° C. The silicone rubber composition may optionally contain various additives commonly used in compositions of this type, for example, reaction controlling agents, pigments, flame retardants, and mold release agents insofar as the benefits of the invention are not lost. Of these, liquid additives may be added during the preparation of the premix liquid or when the premix powder is kneaded with component (A), and powder additives may be added upon mixing of component (B). Alternatively, the additives may be added to and mixed with the silicone rubber base.

The method for preparing a liquid silicone rubber composition according to the present invention permits a reduction in the time required for the preparation of a liquid silicone rubber base by significantly reducing the residence time and permits preparation from the liquid silicon rubber base of a liquid silicone rubber composition having improved viscosity stability during storage and curing into a product having improved fatigue endurance.

EXAMPLE

Examples of the invention are given below by way of illustration and not by way of limitation. In the Examples, parts are by weight and the viscosity is a measurement at 25° C. In preparing a silicone rubber base according to the invention, a system as shown in FIGS. 1 or 2 was used.

Example 1

The system shown in FIG. 1 was used. Using a mixing tank equipped with an agitator blade, 45 parts of a linear dimethylpolysiloxane blocked with a dimethylvinylsilyl group at each end of its molecular chain and having a viscosity of 10,000 centistokes as a main component was mixed with 3 parts of 1,1,1,3,5,7,7,7-octamethyl-3,5-dihydroxytetrasiloxane to form a premix liquid. The premix liquid was mixed with 55 parts of silica powder (Nipsil LP by Nippon Silica K.K.) in a horizontal continuous mixer (Blow Shear Mixer) for a residence time of 1 minute to form a premix powder. The premix powder was then fed to a twin screw continuous kneader through a constant delivery meter. At this point, the linear dimethylpolysiloxane as the main component was fed to the kneader in divided portions. That is, 37 parts was added to the premix powder at the inlet and 79 parts was added near the outlet of the kneader. The total amount of the main component added at the stage of the continuous kneader was 116 parts. The interior of the continuous kneader had the following temperature distribution. The forward region extending from the inlet (0%) to 30% of the entire length was maintained at a temperature of 10 to 50° C. and the aft region extending from the outlet (0%) to 55% of the entire length was maintained at a temperature of 280° C. A vent was disposed near the kneader outlet for removing low molecular weight materials and connected to a vacuum pump which was operated to effect vacuum deaeration. The residence time in the continuous kneader was within 90 seconds.

Example 2

The system shown in FIG. 2 was used. Using a mixing tank equipped with an agitator blade, 45 parts of a linear dimethylpolysiloxane blocked with a dimethylvinylsilyl group at each end of its molecular chain and having a viscosity of 10,000 centistokes as a main component was mixed with 3 parts of 1,1,1,3,5,7,7,7-octamethyl-3,5-dihydroxytetrasiloxane to form a premix liquid. The premix liquid was mixed with 55 parts of silica powder (Nipsil LP by Nippon Silica K.K.) in a horizontal continuous mixer (Blow Shear Mixer) for a residence time of 1 minute to form a premix powder. The premix powder was then fed to a first twin screw continuous kneader through a constant delivery meter. At this point, the linear dimethylpolysiloxane as the main component was fed to the kneader in divided portions. That is, 37 parts was added to the premix powder at the inlet and 79 parts was added near the outlet of the kneader. The total amount of the main component added at the stage of the continuous kneader was 116 parts. The interior of the continuous kneader had the following temperature distribution. The forward region extending from the inlet (0%) to 30% of the entire length was maintained at a temperature of 10 to 50° C. and the aft region extending from the outlet (0%) to 55% of the entire length was maintained at a temperature of 280° C. A vent was disposed near the kneader outlet for removing low molecular weight materials and connected to a vacuum pump which was operated to effect vacuum deaeration. The residence time in the continuous kneader was within 90 seconds. The resulting compound was further heat kneaded in a second continuous kneader serially connected to the first kneader. The second kneader was maintained at 250° C. over its entire region and the residence time was 13 minutes.

Example 3

The system shown in FIG. 2 was used. Using a mixing tank equipped with an agitator blade, 45 parts of a linear dimethylpolysiloxane blocked with a dimethylvinylsilyl group at each end of its molecular chain and having a viscosity of 10,000 centistokes as a main component was mixed with 3 parts of 1,1,1,3,5,7,7,7-octamethyl-3,5-dihydroxytetrasiloxane to form a premix liquid. The premix liquid was mixed with 55 parts of silica powder (Nipsil LP by Nippon Silica K.K.) in a horizontal continuous mixer (Blow Shear Mixer) for a residence time of 1 minute to form a premix powder. The premix powder was then fed to a first twin screw continuous kneader through a constant delivery meter. At this point, the linear dimethylpolysiloxane as the main component was fed to the kneader in divided portions. That is, 37 parts was added to the premix powder at the inlet and 79 parts was added near the outlet of the kneader. The total amount of the main component added at the stage of the continuous kneader was 116 parts. The interior of the continuous kneader had the following temperature distribution. The forward region extending from the inlet (0%) to 30% of the entire length was maintained at a temperature of 10 to 50° C. and the aft region extending from the outlet (0%) to 55% of the entire length was maintained at a temperature of 200° C. A vent was disposed near the kneader outlet for removing low molecular weight materials and connected to a vacuum pump which was operated to effect vacuum deaeration. The residence time in the continuous kneader was within 90 seconds. The resulting compound was further heat kneaded in a second continuous kneader serially connected to the first kneader. The second kneader was maintained at 150° C. over its entire region and the residence time was 13 minutes.

Comparative Example 1

The system shown in FIG. 1 was used. Using a mixing tank equipped with an agitator blade, 45 parts of a linear dimethylpolysiloxane blocked with a dimethylvinylsilyl group at each end of its molecular chain and having a viscosity of 10,000 centistokes as a main component was mixed with 3 parts of hexamethyldisilazane to form a premix liquid. The premix was mixed with 55 parts of silica powder (Nipsil LP by Nippon Silica K.K.) in a horizontal continuous mixer (Blow Shear Mixer) for a residence time of 1 minute to form a premix powder. The premix powder was then fed to a twin screw continuous kneader through a constant delivery meter. At this point, the linear dimethylpolysiloxane as the main component was fed to the kneader in divided portions. That is, 37 parts was added to the premix powder at the inlet and 79 parts was added near the outlet of the kneader. The total amount of the main component added at the stage of the continuous kneader was 116 parts. The interior of the continuous kneader had the following temperature distribution. The forward region extending from the inlet (0%) to 30% of the entire length was maintained at a temperature of 10 to 50° C. and the aft region extending from the outlet (0%) to 55% of the entire length was maintained at a temperature of 280° C. A vent was disposed near the kneader outlet for removing low molecular weight materials and connected to a vacuum pump which was operated to effect vacuum deaeration. The residence time in the continuous kneader was within 90 seconds.

Comparative Example 2

The system shown in FIG. 2 was used. Using a mixing tank equipped with an agitator blade, 45 parts of a linear dimethylpolysiloxane blocked with a dimethylvinylsilyl group at each end of its molecular chain and having a viscosity of 10,000 centistokes as a main component was mixed with 3 parts of hexamethyldisilazane to form a premix liquid. The premix was mixed with 55 parts of silica powder (Nipsil LP by Nippon Silica K.K.) in a horizontal continuous mixer (Blow Shear Mixer) for a residence time of 1 minute to form a premix powder. The premix powder was then fed to a first twin screw continuous kneader through a constant delivery meter. At this point, the linear dimethylpolysiloxane as the main component was fed to the kneader in divided portions. That is, 37 parts was added to the premix powder at the inlet and 79 parts was added near the outlet of the kneader. The total amount of the main component added at the stage of the continuous kneader was 116 parts. The interior of the continuous kneader had the following temperature distribution. The forward region extending from the inlet (0%) to 30% of the entire length was maintained at a temperature of 10 to 50° C. and the aft region extending from the outlet (0%) to 55% of the entire length was maintained at a temperature of 280° C. A vent was disposed near the kneader outlet for removing low molecular weight materials and connected to a vacuum pump which was operated to effect vacuum deaeration. The residence time in the continuous kneader was within 90 seconds. The resulting compound was further heat kneaded in a second continuous kneader serially connected to the first kneader. The second kneader was maintained at 250° C. over its entire region and the residence time was 13 minutes.

Tests on Liquid Silicone Rubber Base

The liquid silicone rubber bases obtained in Examples 1–3 and Comparative Examples 1–2 were examined by the following tests.

Using B type rotating viscometer by Tokyo Keiki K.K., a liquid silicone rubber base was measured for viscosity before and after heating at 105° C. for 6 hours.

For the measurement of the physical properties and fatigue endurance of a liquid silicone rubber base, a test sheet was prepared by mixing 100 parts of the liquid silicone rubber base with 25 parts of the linear dimethylpolysiloxane, 3 parts of methylhydrogenpolysiloxane of the formula shown below as a crosslinking agent, 0.3 part of a 1% isopropyl alcohol solution of chloroplatinic acid as a platinum catalyst, and 0.3 part of ethynyl cyclohexanol as a reaction inhibitor, forming the mixture into a sheet, and curing at 120° C. for 10 minutes.

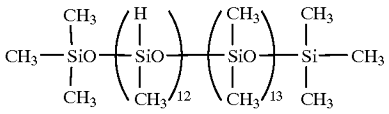

Physical properties were measured according to JIS K-6301. Constant elongation fatigue was determined by punching a No. 3 dumbbell specimen out of the sheet, setting the specimen on a de Mattia machine (Toyo Seiki K.K.) according to JIS K-6301, subjecting the specimen to reciprocal motion of 100% elongation (repetitively elongated between 0% and 100%) at a rate of 300 cycles/min. until the specimen was ruptured.

The results are shown in Table 1.

TABLE 1

| | Base compound viscosity (poise) | | Hardness | Tensile strength | Elongation | Fatigue endurance |
|---|---|---|---|---|---|---|
| | Initial | 105° C./6 hr. | (JIS-A) | (kgf/cm$^2$) | (%) | (×10$^4$ cycles) |
| E1 | 800 | 1400 | 40 | 80 | 370 | 1200 |
| E2 | 800 | 900 | 39 | 80 | 400 | 1350 |
| E3 | 800 | 2000 | 40 | 70 | 280 | 1100 |
| CE1 | 790 | 1600 | 40 | 65 | 260 | 700 |
| CE2 | 850 | 2600 | 41 | 61 | 260 | 650 |

It is evident that the method of the invention is successful in briefly preparing a liquid silicone rubber base which is improved in viscosity stability during storage and producing a liquid silicone rubber composition which is significantly improved in fatigue endurance.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a high fatigue endurance liquid silicone rubber composition comprising (A) an organopolysiloxane having at least two alkenyl groups each attached to a silicon atom in a molecule and having a viscosity of 100 to 300,000 centistokes at 25° C., (B) a reinforcing silica filler having a specific surface area of at least 50 m$^2$/g as measured by the BET method, (C) a mixing assistant of the following general formula (1) or (2):

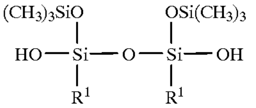

(1)

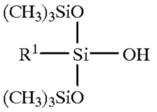

(2)

wherein R' is a methyl, trimethylsiloxy, vinyl or trifluoropropyl group, (E) an organohydrogenpolysiloxane having at least two hydrogen atoms each attached to a silicon atom in a molecule, (F) a platinum catalyst, and optionally, (D) an auxiliary catalyst capable of promoting a wetting effect, said method for preparing said high fatigue endurance liquid silicone rubber composition comprising the steps of:

previously mixing 10 to 120 parts by weight of component (A) with 1 to 35 parts by weight of component (C) and 0 to 35 parts by weight of component (D) per 100 parts by weight of component (C) to form a premix liquid, mixing the premix liquid with 100 parts by weight of component (B) to form a premix power, kneading 100 parts by weight of the premix powder with at least 20 parts by weight of component (A) to form a liquid silicone rubber base, and thereafter, adding a curing agent consisting of components (E) and (F) to the liquid silicone rubber base.

2. The method of claim 1 wherein the step of kneading the premix powder with component (A) is carried out by means of a single, twin or multiple screw continuous kneader having an entire length between an inlet and an outlet wherein an aft region extending from the outlet to a position of 10 to 80% of the entire length toward the inlet is maintained at a temperature of 200 to 350° C. and a forward region extending from the inlet to a position of less than 50% of the entire length toward the outlet and not overlapping the aft region is maintained at a temperature of not higher than 60° C.

3. The method of claim 2 wherein the step of kneading the premix powder with component (A) includes feeding the premix powder and a part of the component (A) to be kneaded therewith into the forward region of the kneader and feeding the remainder of the component (A) into the aft region.

4. The method of claim 2 wherein the kneader is provided at the outlet with a vacuum deaerator for removing low molecular weight materials and unreacted materials from the liquid silicone rubber base.

5. The method of claim 2 wherein the kneader at the outlet is connected to a second single, twin or multiple screw continuous kneader which is maintained at a temperature of 150 to 300° C. for further kneading the silicone rubber base.

* * * * *